(12) United States Patent
Wu et al.

(10) Patent No.: US 12,265,249 B1
(45) Date of Patent: Apr. 1, 2025

(54) LIGHT-EMITTING MODULE OF ILLUMINATED KEYBOARD

(71) Applicant: SUNREX TECHNOLOGY CORP., Taichung (TW)

(72) Inventors: Chih-Hsien Wu, Taichung (TW); Shih-Pin Lin, Taichung (TW); Li-Ling Huang, Taichung (TW); Zhi-Xuan Zhang, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/666,133

(22) Filed: May 16, 2024

(30) Foreign Application Priority Data

Jan. 12, 2024 (TW) ................................ 113200456

(51) Int. Cl.
*F21V 8/00* (2006.01)
(52) U.S. Cl.
CPC ......... *G02B 6/0088* (2013.01); *G02B 6/0021* (2013.01)
(58) Field of Classification Search
CPC ..... G02B 6/0021; G02B 6/0088; G02B 6/009
See application file for complete search history.

(56) References Cited

U.S. PATENT DOCUMENTS

| 11,366,263 | B1* | 6/2022 | Ho | F21V 11/16 |
| 2023/0358944 | A1* | 11/2023 | Liu | G02B 6/005 |
| 2024/0094457 | A1* | 3/2024 | Chen | G02B 6/0043 |

FOREIGN PATENT DOCUMENTS

TW 201630018 8/2016

OTHER PUBLICATIONS

Inovation Q+ NPL Search (Year: 2024).*

* cited by examiner

*Primary Examiner* — Anabel Ton
(74) *Attorney, Agent, or Firm* — Burris Law, PLLC

(57) ABSTRACT

A light-emitting module of an illuminated keyboard includes a reflector plate, a light guiding plate, a light shielding plate, a base plate, a thin film circuit board, and a light-emitting element. The light guiding plate is disposed on the reflector plate. The light shielding plate is disposed on the light guiding plate and includes a through hole and a first light-passing hole that is spaced apart from the through hole. The base plate is disposed on the light shielding plate and includes an accommodating hole that is aligned with the through hole and a second light-passing hole that is spaced part from the accommodating hole and that is aligned with the first light-passing hole. The thin film circuit board is disposed on the base plate. The light-emitting element is disposed on the thin film circuit board and extends into the accommodating hole.

7 Claims, 3 Drawing Sheets

LIGHT-EMITTING MODULE OF ILLUMINATED KEYBOARD

CROSS-REFERENCE TO RELATED APPLICATION

This application claims priority to Taiwanese Utility Model Patent Application No. 113200456, filed on Jan. 12, 2024, the entire disclosure of which is incorporated by reference herein.

FIELD

The disclosure relates to a light-emitting module, and more particularly to a light-emitting module of an illuminated keyboard.

BACKGROUND

A conventional illuminated keyboard disclosed in Taiwanese Invention Patent Application Publication No. 201630018A includes a backlight module, a base plate disposed on the backlight module, a thin film circuit board disposed on the base plate, and a keycap disposed on the thin film circuit board. The backlight module includes a reflector plate, a light-emitting unit disposed on the reflector plate, and a light guiding plate disposed on the light-emitting unit. The light guiding plate is adapted to guide light that is emitted from the light-emitting unit. However, since location of the light-emitting unit of the backlight module is unchangeable, illuminated effect of each of the keys on the conventional illuminated keyboard is limited to its location and a structural design of the backlight module, and thus it is difficult to adjust brightness of a specific key.

SUMMARY

Therefore, an object of the disclosure is to provide a light-emitting module of an illuminated keyboard that can alleviate at least one of the drawbacks of the prior art.

According to the disclosure, the light-emitting module of an illuminated keyboard includes a reflector plate, a light guiding plate, a light shielding plate, a base plate, a thin film circuit board, and a light-emitting element. The light guiding plate is disposed on the reflector plate and includes a plate hole. The light shielding plate is disposed on the light guiding plate and includes a bottom surface that faces toward the light guiding plate, a top surface that is opposite to the bottom surface, a through hole that extends from the bottom surface to the top surface, and a first light-passing hole that is spaced apart from the through hole. The through hole is aligned with the plate hole and has a bottom opening that is formed on the bottom surface. The base plate is disposed on the top surface of the light shielding plate and includes an accommodating hole that is aligned with the through hole, and a second light-passing hole that is spaced part from the accommodating hole and that is aligned with the first light-passing hole. The thin film circuit board is disposed on the base plate and has a bottom side surface that faces toward the base plate. The light-emitting element is disposed on the bottom side surface of the thin film circuit board and extends into the accommodating hole. The light-emitting element has a bottom end surface that faces toward the reflector plate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
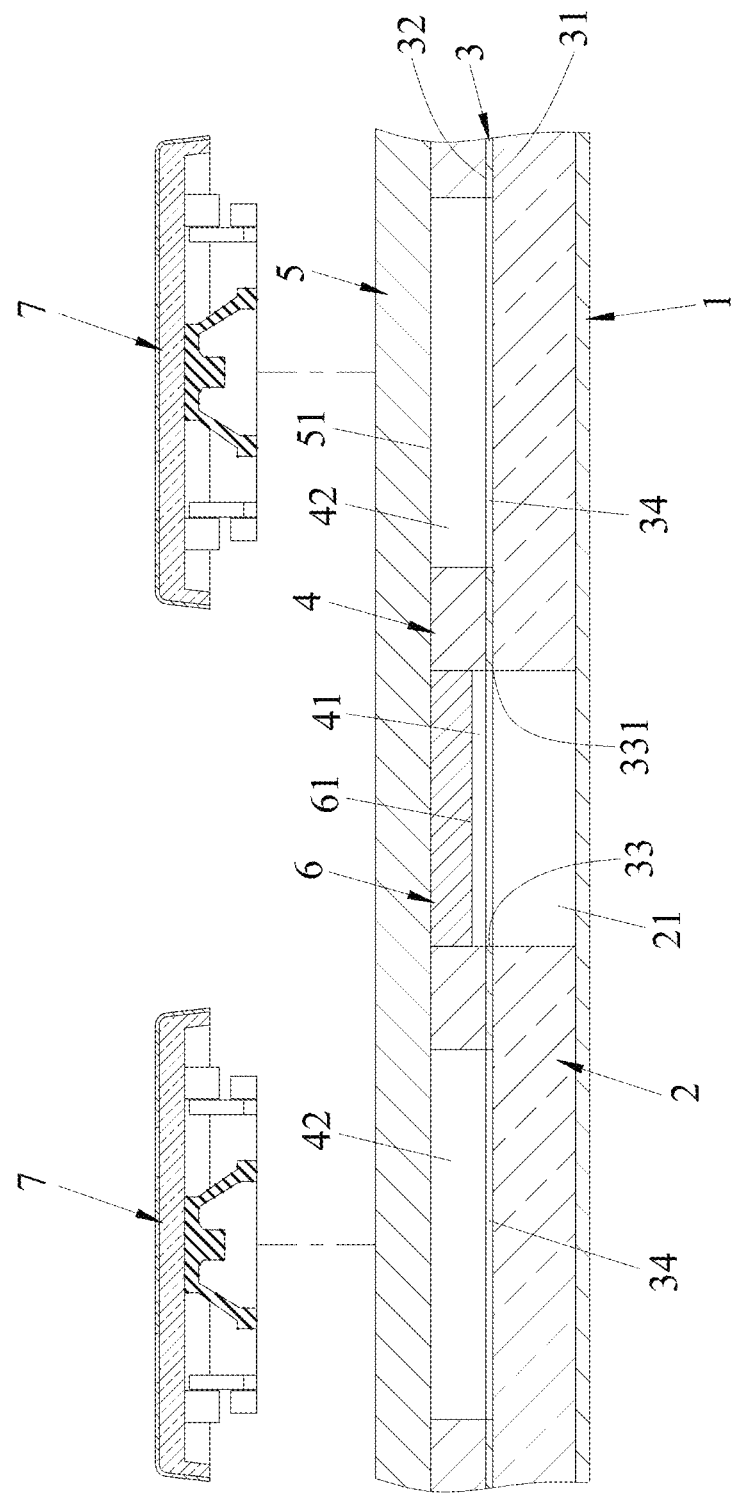
FIG. 1 is a fragmentary schematic sectional view illustrating a first embodiment of a light-emitting module of an illuminated keyboard according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, a first embodiment of a light-emitting module of an illuminated keyboard according to the disclosure is adapted for a plurality of key units 7 to be installed thereon. The light-emitting module of an illuminated keyboard includes a reflector plate 1, a light guiding plate 2, a light shielding plate 3, a base plate 4, a thin film circuit board 5 and a plurality of light-emitting elements 6 (only one is shown). It should be noted that only one of the light-emitting elements 6 will be illustrated in the following for the sake of brevity.

The light guiding plate 2 is disposed on the reflector plate 1 and includes a plurality of plate holes 21 (only one is shown in FIG. 1).

The light shielding plate 3 is disposed on the light guiding plate 2, and is adapted to prevent light rays that are emitted from the light-emitting elements 6 from illuminating an undesired location on the keyboard. The light shielding plate 3 includes a bottom surface 31 that faces toward the light guiding plate 2, a top surface 32 that is opposite to the bottom surface 31, a plurality of through holes 33 (only one is shown in FIG. 1) that extend from the bottom surface 31 to the top surface 32, and a plurality of first light-passing holes 34 (only two are shown in FIG. 1) that are spaced apart from the through holes 33. The through holes 33 are respectively aligned with the plate holes 21, and each of the through holes 33 has a bottom opening 331 that is formed on the bottom surface 31. A number of the first light-passing holes 34 corresponds to that of the key units 7.

The base plate 4 is disposed on the top surface 32 of the light shielding plate 3, and includes a plurality of accommodating holes 41 (only one is shown in FIG. 1) that are respectively aligned with the through holes 33, and a plurality of second light-passing holes 42 (only two are shown in FIG. 1) that are spaced part from the accommodating holes 41 and that are respectively aligned with the first light-passing holes 34. A number of the second light-passing holes 42 corresponds to that of the first light-passing holes 34.

The thin film circuit board 5 is disposed on the base plate 4 and has a bottom side surface 51 that faces toward the base plate 4 and that covers the bottom openings 331 of the through holes 33.

The light-emitting element 6 is disposed on the bottom side surface 51 of the thin film circuit board 5 and extends into one of the accommodating holes 41. That is to say, the light-emitting element 6 is inserting into the accommodating hole 41 of the base plate 4 and is secured and supported by side walls of the base plate 4 that border the accommodating hole 41.

The light-emitting element 6 has a bottom end surface 61 that faces toward the reflector plate 1. On a cross-section of the light-emitting module that is perpendicular to the bottom end surface 61 of the light-emitting element 6, the bottom openings 331 of the through holes 33 and openings of the plate holes 21, an outer width of the light-emitting element 6 is equal to an inner width of the accommodating hole 41, and an inner width of each of the plate holes 21, an inner width of each of the through holes 33 and the inner width of each of the accommodating holes 41 are identical. That is to say, when the light-emitting element 6 is inserted into the accommodating hole 41, light emitted from the light-emitting element 6 may unobstructedly reach the reflector plate 1 due to the configuration.

The key units 7 are disposed on the thin film circuit board 5 and respectively correspond in position to the second light-passing holes 42.

In this embodiment, the light-emitting element 6 is a light-emitting diode (LED). In the following, a path of one of the light rays emitted from the light-emitting element 6 is illustrated.

After the light ray is emitted downward from the light-emitting element 6 and passes through the corresponding accommodating hole 41, a respective one of the through holes 33, and a respective one of the plate holes 21 to the reflector plate 1 and is reflected thereby, the light ray is guided by the light guiding plate 2 to sequentially pass through one of the first light-passing holes 34 and a respective one of the second light-passing holes 42 to the thin film circuit board 5, thereby illuminating a respective one of the key units 7. Compared to the prior art, in which an LED device of a conventional backlight module is disposed on and fixed to a reflector plate, in the light-emitting module of the illuminated keyboard of the disclosure, the light-emitting elements 6 are disposed on the thin film circuit board 5. When a user intends to adjust a brightness or a color of the light illuminating the key unit 7, without removing the light guiding plate 2 or the reflector plate 1, they may remove the thin film circuit board 5 from the base plate 4 and directly replace one or more of the light-emitting elements 6 on the thin film circuit board 5, or they may replace the thin film circuit board 5 with another thin film circuit board having different light-emitting elements installed thereon. Accordingly, illuminated effect of the illuminated keyboard may be adjusted more easily and conveniently.

Figure 2:
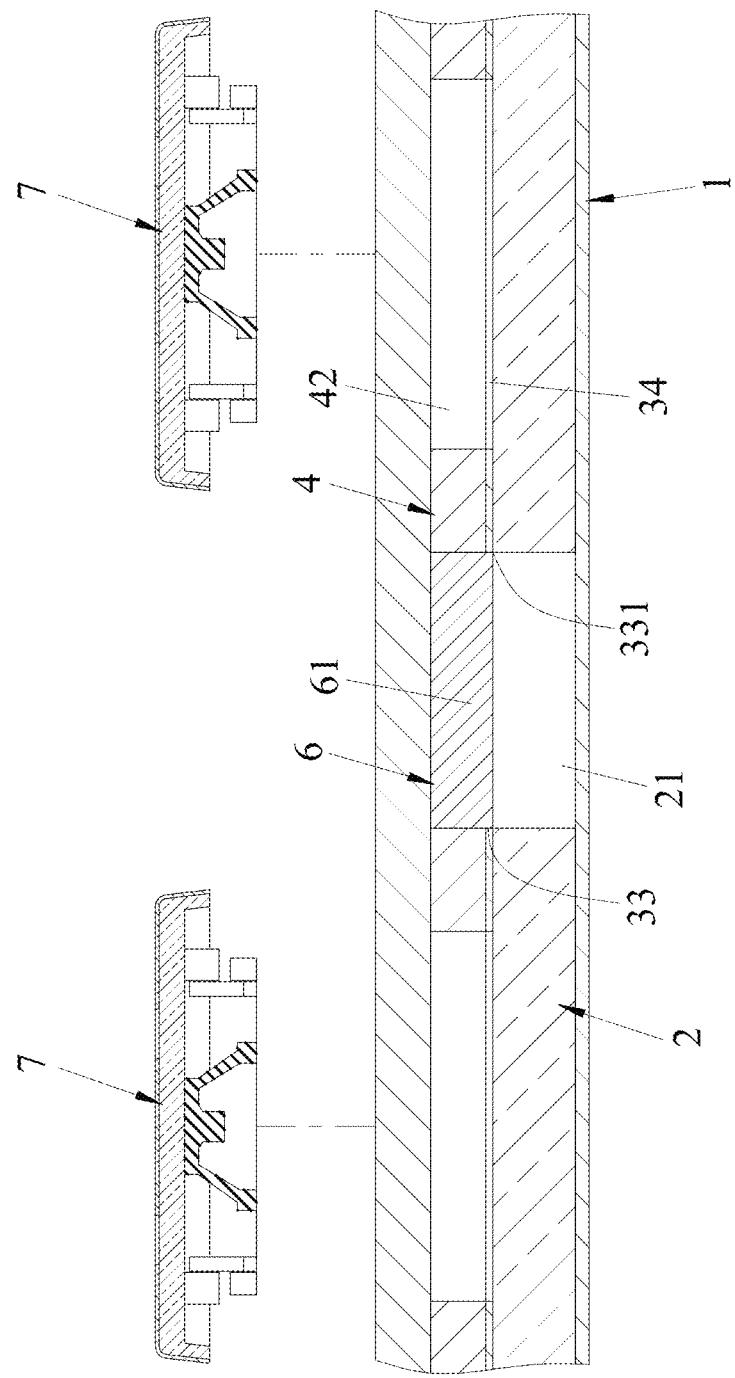
FIG. 2 is a fragmentary schematic sectional view illustrating a second embodiment of the light-emitting module of an illuminated keyboard according to the disclosure.

Referring to FIG. 2, a second embodiment of the light-emitting module of the illuminated keyboard according to the disclosure is similar to the first embodiment. A difference between the first and second embodiments lies in that the light-emitting element 6 extends downward to the through hole 33, but the bottom end surface 61 of the light-emitting element 6 does not extend into the plate hole 21 and is flush with the bottom opening 331 of the through hole 33 on the bottom surface 31. That is to say, the bottom end surface 61 of the light-emitting element 6 is located between the bottom side surface 51 of the thin film circuit board 5 and the bottom opening 331 of the through hole 33. In the second embodiment, the light ray emitted from the light-emitting element 6 passes through the plate hole 21 to the reflector plate 1 and is reflected thereby, and is guided by the light guiding plate 2 to sequentially pass through the first light-passing hole 34 and the second light-passing hole 42 to the thin film circuit board 5, thereby illuminating the key unit 7. In addition, in such configuration, a relatively large amount of light is emitted to the light guiding plate 2, which further enhances the illuminating effect of the disclosure.

Figure 3:
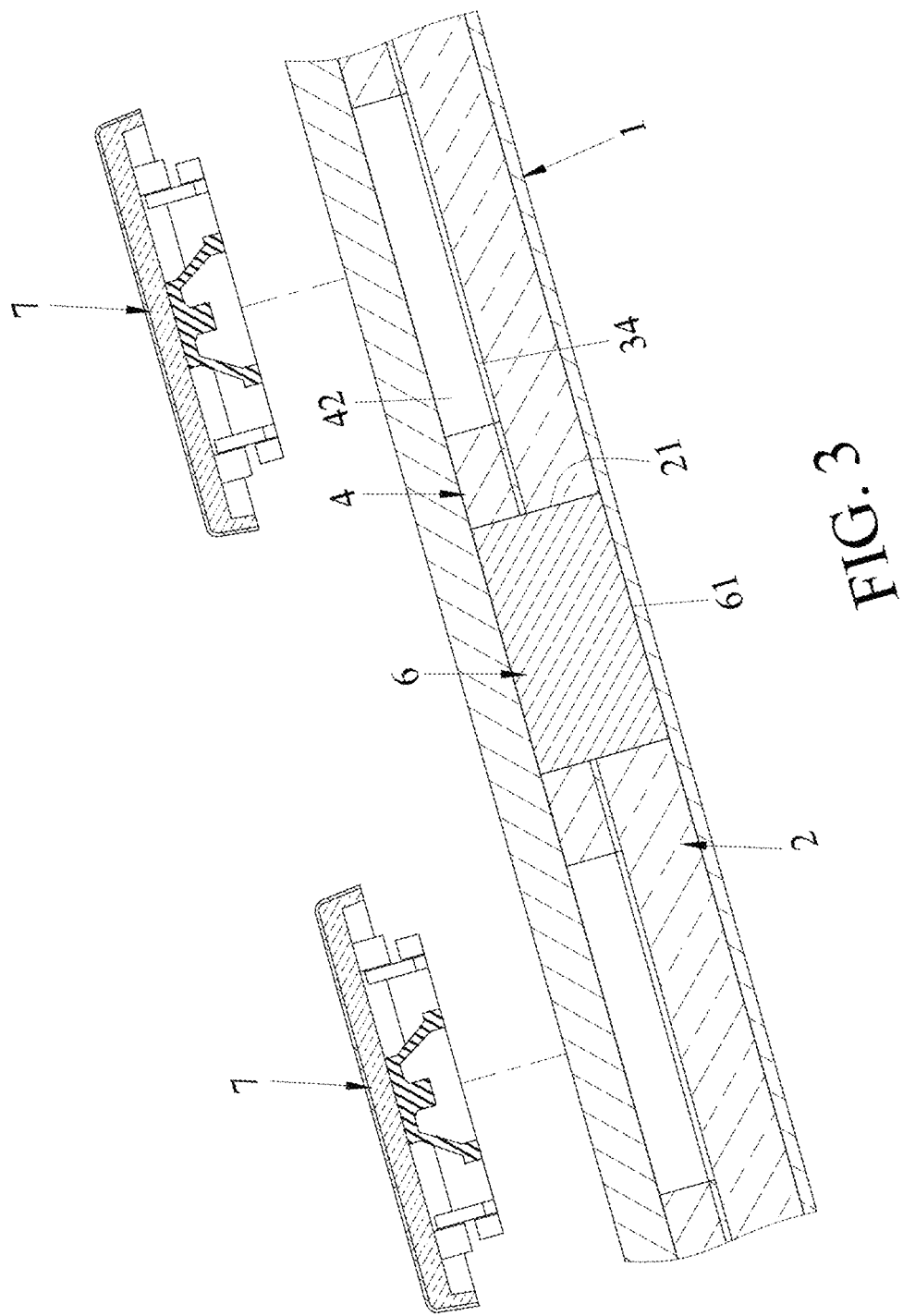
FIG. 3 is a fragmentary schematic sectional view illustrating a third embodiment of the light-emitting module of an illuminated keyboard according to the disclosure.

Referring to FIG. 3, a third embodiment of the light-emitting module of the illuminated keyboard according to the disclosure is similar to the first embodiment. A difference between the first and third embodiments lies in that the light-emitting element 6 extends downward to the plate hole 21 and is in contact with the reflector plate 1. That is to say, the bottom end surface 61 of the light-emitting element 6 extends into the plate hole 21 and abuts against the reflector plate 1. In the third embodiment, the light ray emitted from the light-emitting element 6 is reflected by the reflector plate 1, and is guided by the light guiding plate 2 to sequentially pass through the first light-passing hole 34 and the second light-passing hole 42 to the thin film circuit board 5, thereby illuminating the key unit 7. In addition, in such configuration, the light is directly emitted to the reflector plate 1 and is reflected by the light guiding plate 2, which further enhances the illuminating effect of the disclosure.

Accordingly, by virtue of disposing the light-emitting elements 6 on the thin film circuit board 5, it is more convenient to replace the light-emitting elements 6, thereby more easily adjusting the illuminating effect of the disclosure based on the actual demand, such as brightness or a color of the light illuminating on a specific area of the illuminated keyboard.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light-emitting module of an illuminated keyboard, comprising:
- a reflector plate;
- a light guiding plate disposed on said reflector plate and including a plate hole;
- a light shielding plate disposed on said light guiding plate and including a bottom surface that faces toward said light guiding plate, a top surface that is opposite to said bottom surface, a through hole that extends from said bottom surface to said top surface, and a first light-passing hole that is spaced apart from said through hole, said through hole being aligned with said plate hole and having a bottom opening that is formed on said bottom surface;
- a base plate disposed on said top surface of said light shielding plate and including an accommodating hole that is aligned with said through hole, and a second light-passing hole that is spaced part from said accommodating hole and that is aligned with said first light-passing hole;
- a thin film circuit board disposed on said base plate and having a bottom side surface that faces toward said base plate; and
- a light-emitting element disposed on said bottom side surface of said thin film circuit board and extending into said accommodating hole, said light-emitting element having a bottom end surface that faces toward said reflector plate.

2. The light-emitting module as claimed in claim 1, wherein said light-emitting element is inserted into said accommodating hole, and on a cross-section of said light-emitting module that is perpendicular to said bottom end surface of said light-emitting element, said bottom opening of said through hole and an opening of said plate hole, an outer width of said light-emitting element is equal to an inner width of said accommodating hole.

3. The light-emitting module as claimed in claim 2, wherein
on the cross-section of said light-emitting module, an inner width of said plate hole, an inner width of said through hole and the inner width of said accommodating hole are identical.

4. The light-emitting module as claimed in claim 1, wherein
said bottom end surface of said light-emitting element is located between said bottom side surface of said thin film circuit board and said bottom opening of said through hole.

5. The light-emitting module as claimed in claim 1, wherein
said bottom end surface of said light-emitting element does not extend into said plate hole and is flush with said bottom opening of said through hole on said bottom surface.

6. The light-emitting module as claimed in claim 1, wherein
said bottom end surface of said light-emitting element extends into said plate hole.

7. The light-emitting module as claimed in claim 6, wherein
said bottom end surface of said light-emitting element abuts against said reflector plate.

* * * * *